(12) United States Patent
Hakamata et al.

(10) Patent No.: US 10,936,265 B2
(45) Date of Patent: Mar. 2, 2021

(54) PRINTING CONTROL METHOD AND PRINTING CONTROL SYSTEM USING IDENTIFIERS

(71) Applicant: FUJITSU LIMITED, Kawasaki (JP)

(72) Inventors: Junki Hakamata, Yokohama (JP);
Takumi Toyoshima, Yokohama (JP);
Ryosuke Hyogo, Kawasaki (JP);
Tetsuhiro Yamaguchi, Yokohama (JP);
Kaori Imori, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/724,163

(22) Filed: Dec. 20, 2019

(65) Prior Publication Data

US 2020/0210125 A1 Jul. 2, 2020

(30) Foreign Application Priority Data

Dec. 27, 2018 (JP) .............................. JP2018-246024

(51) Int. Cl.
*G06F 3/12* (2006.01)
(52) U.S. Cl.
CPC .......... *G06F 3/1287* (2013.01); *G06F 3/1205* (2013.01); *G06F 3/1224* (2013.01)

(58) Field of Classification Search
None
See application file for complete search history.

(56) References Cited

U.S. PATENT DOCUMENTS

2017/0264616 A1 9/2017 Maruyama
2018/0101334 A1 4/2018 Suzuki

FOREIGN PATENT DOCUMENTS

JP 2017-162368 A 9/2017
JP 2018-63705 A 4/2018

*Primary Examiner* — Lennin R Rodriguezgonzalez
(74) *Attorney, Agent, or Firm* — Fujitsu Patent Center

(57) ABSTRACT

A computer-implemented printing control method includes receiving a first identifier input at a time of logging in to an application on a terminal, and information indicating a storage location of printing data stored in a storage device, an instruction to print the printing data being received on the application, transmitting, in accordance with at least one of the first identifier or the information, a request for acquiring the printing data to a storage application configured to control the storage device, storing the printing data acquired from the storage application in association with a second identifier, and outputting a list of the printing data stored in association with the second identifier in response to receiving the second identifier from a printing device.

4 Claims, 11 Drawing Sheets

FIG. 6

| | URL POSTER | FILE ACCESS RIGHT | ACCESSIBILITY |
|---|---|---|---|
| 1 | userA | OWNER:userA | OK |
| 2 | userA | OWNER:userB | NG |
| 3 | userA | OWNER:userB<br>ALLOWED TO EDIT:userA | OK |
| 4 | userA | OWNER:userB<br>ALLOWED TO VIEW:userA | OK |
| 5 | userA | OWNER:userB<br>USER KNOWING URL | OK |

PRINTING CONTROL METHOD AND PRINTING CONTROL SYSTEM USING IDENTIFIERS

CROSS-REFERENCE TO RELATED APPLICATION

This application is based upon and claims the benefit of priority of the prior Japanese Patent Application No. 2018-246024, filed on Dec. 27, 2018, the entire contents of which are incorporated herein by reference.

FIELD

The embodiments discussed herein are related to a printing control technology.

BACKGROUND

A printing system (anywhere-printing system) has recently been used in which printing may be performed by various models of image forming devices installed at various locations by requesting printing from a printing server that controls printing and undergoing authentication by an image forming device such as a compound machine, a printer, or the like coupled to the printing server by a network. Here, a compound machine is a device having a plurality of functions such as a printing function, a copy function, a scanning function, a facsimile (FAX) function, and the like.

Incidentally, as a technology related to printing, there is a system that shortens a time to a start of printing and reduces traffic as compared with a case where data is distributed to the inside of a terminal used by a user, by transmitting a document to be printed from a document storage device to an image processing device without distributing the data to the inside of the terminal.

In addition, there is a system that obviates a need for a dedicated printing intermediary server, in which system a portable terminal transmits output data to a cloud and transmits obtainment destination specifying information specifying a destination from which to obtain the output data to an apparatus, and the apparatus obtains the output data from the cloud according to the obtainment destination specifying information and outputs the output data.

Related technologies are disclosed in Japanese Laid-open Patent Publication No. 2017-162368 and Japanese Laid-open Patent Publication No. 2018-63705, for example.

SUMMARY

According to an aspect of the embodiment, a computer-implemented printing control method includes receiving a first identifier input at a time of logging in to an application on a terminal, and information indicating a storage location of printing data stored in a storage device, an instruction to print the printing data being received on the application, transmitting, in accordance with at least one of the first identifier or the information, a request for acquiring the printing data to a storage application configured to control the storage device, storing the printing data acquired from the storage application in association with a second identifier, and outputting a list of the printing data stored in association with the second identifier in response to receiving the second identifier from a printing device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating an example of access determination;

DESCRIPTION OF EMBODIMENTS

When an anywhere-printing system as described above is to be used from a terminal, a dedicated printing app needs to be installed on the terminal. However, installing the dedicated printing app on the terminals of all users involves management cost.

Incidentally, uploading a file by using a chat type app may obviate the need for the printing app. However, storing a file on the terminal leads to a security risk. In addition, a file stored in a specific directory may be printed by using a cloud storage service. However, this involves the cost of managing the directory for each user.

Embodiments of a printing control program, a printing control method, and a printing control system disclosed in the present application will hereinafter be described in detail with reference to the drawings. It is to be noted that the present embodiments do not limit the disclosed technology.

Figure 1:
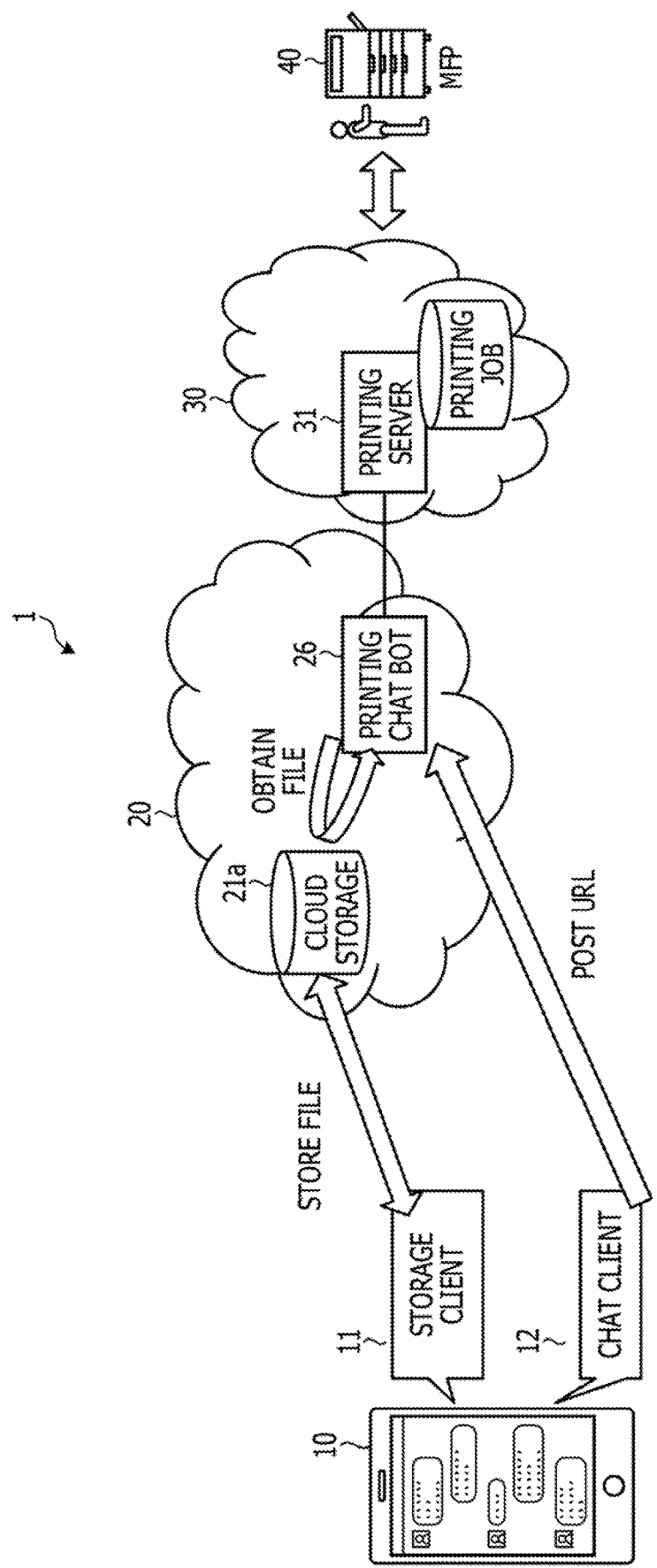
FIG. 1 is a diagram of assistance in explaining a printing system according to an embodiment.

A printing system according to an embodiment will first be described. FIG. 1 is a diagram of assistance in explaining a printing system according to an embodiment. As illustrated in FIG. 1, in the printing system 1 according to the embodiment, a user stores a file in a cloud storage 21a as a nonvolatile storage device on a cloud 20 by using a storage client 11 of a mobile terminal 10. Here, the storage client 11 is an application program installed on the mobile terminal 10 when the cloud storage 21a is to be used from the mobile terminal 10. The storage client 11 is, for example, One Drive (registered trademark, the same applies hereinafter), Google (registered trademark, the same applies hereinafter) Drive, iCloud (registered trademark, the same applies hereinafter), Amazon (registered trademark, the same applies hereinafter) Drive. The printing system 1 is an example of a printing control system.

Then, the user copies the uniform resource locator (URL) of a file desired to be printed, and posts the URL to a chat client 12 with a printing chat bot 26 as a posting destination. Here, the chat client 12 is an application program installed on the mobile terminal 10 when a chat is to be performed by using the mobile terminal 10. The chat client 12 is, for example, Teams, Slack, Line (registered trademark, the same applies hereinafter), or Skype (registered trademark, the same applies hereinafter).

In addition, the printing chat bot 26 is a Web app for anywhere printing, and operates as a chat partner in the cloud 20. The printing chat bot 26 obtains a file from the cloud storage 21a by using a URL, and transmits a printing request to a printing server 31 operating in a cloud 30. Here, the printing server 31 is a server that receives a printing request in anywhere printing, stores the printing request as a printing job, and transmits printing job list information and data for printing to a multifunction peripheral (MFP: compound machine) 40.

Thus, in the printing system 1, when the user posts the URL to the chat client 12, the URL is transmitted to the printing chat bot 26, and the printing chat bot 26 obtains the file from the cloud storage 21a and transmits a printing request to the printing server 31. Hence, the printing system 1 may realize anywhere printing without a dedicated printing app being installed on the mobile terminal 10.

Figure 2:
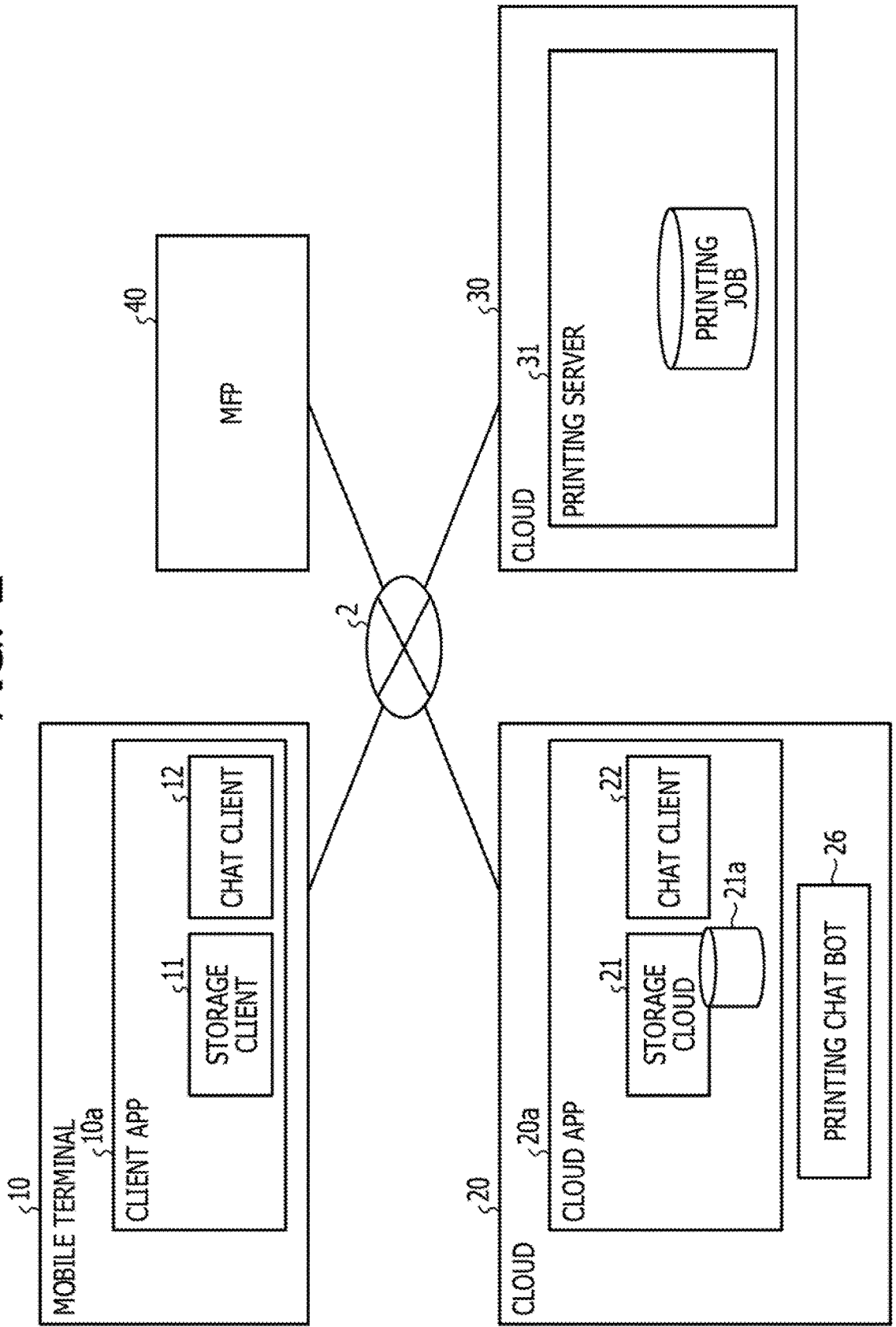
FIG. 2 is a diagram illustrating a configuration of a printing system.

A configuration of the printing system 1 will next be described. FIG. 2 is a diagram illustrating a configuration of a printing system. The printing system illustrated by reference to FIG. 2 may be the printing system 1 illustrated in FIG. 1. As illustrated in FIG. 2, the printing system 1 is implemented by the mobile terminal 10, the cloud 20, the cloud 30, and the MFP 40. The mobile terminal 10, the cloud 20, the cloud 30, and the MFP 40 are coupled to each other by a network 2. Incidentally, while only one mobile terminal 10 is illustrated here for the convenience of description, there are a plurality of mobile terminals 10.

A client app 10a operates on the mobile terminal 10. The client app 10a includes the storage client 11 and the chat client 12.

A cloud app 20a and the printing chat bot 26 operate in the cloud 20. The cloud app 20a is an application that provides service to the user of the mobile terminal 10 in cooperation with the client app 10a. The cloud app 20a includes a storage cloud 21 and a chat cloud 22.

The storage cloud 21 provides functions of a storage application to the user of the mobile terminal 10 in cooperation with the storage client 11. The user of the mobile terminal 10 may store a file in the cloud 20 and use the file by using the functions of the storage application.

The chat cloud 22 provides functions of a chat application to the user of the mobile terminal 10 in cooperation with the chat client 12. The user of the mobile terminal 10 may have a chat with a user of another mobile terminal 10 by using the functions of the chat application.

The printing chat bot 26 receives the URL of a printing file from the chat cloud 22, and obtains the printing file by specifying the received URL. The printing chat bot 26 generates a printing request using the obtained printing file, and transmits the printing request to the printing server 31 included in the cloud 30.

Figure 3:
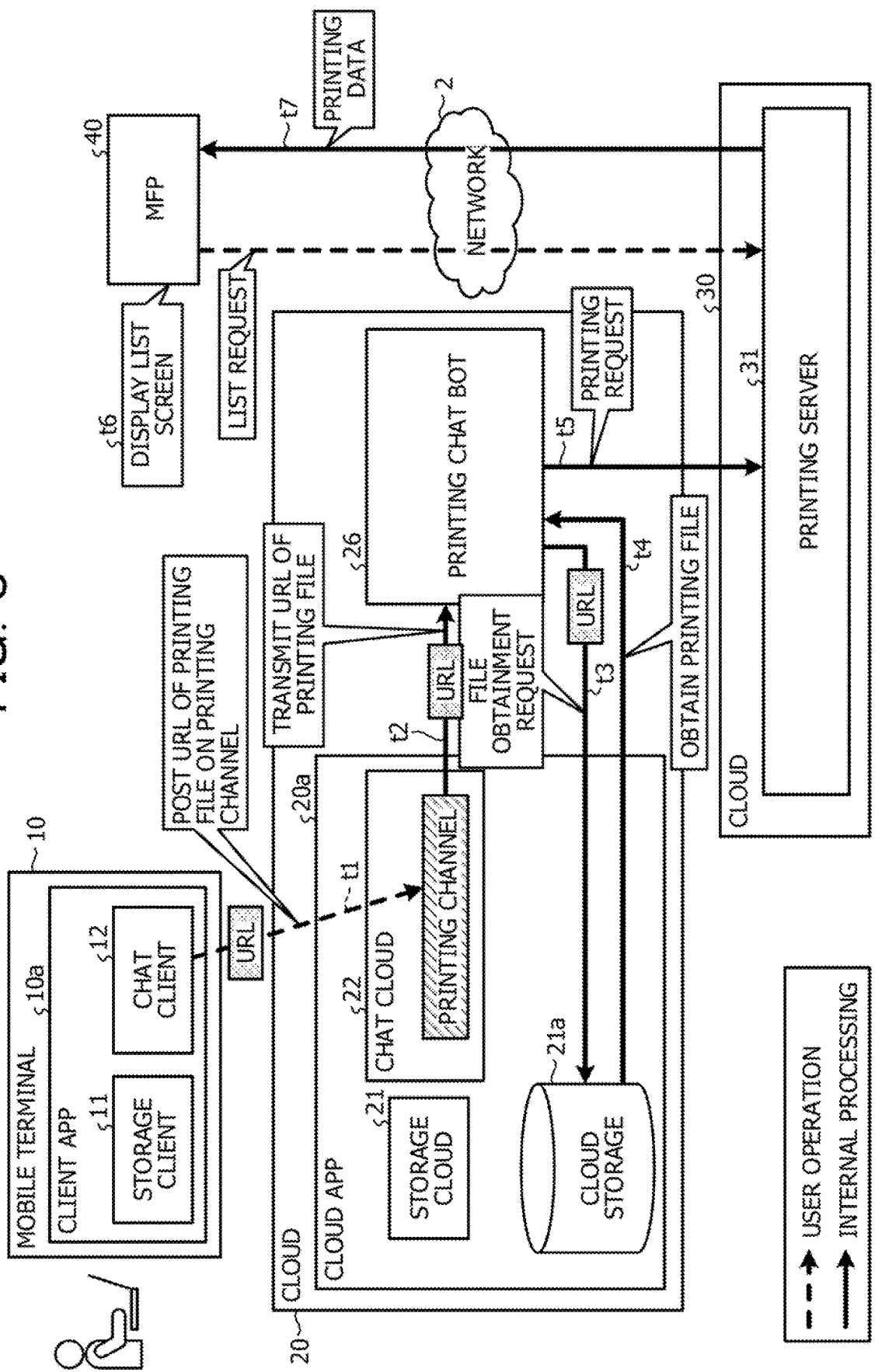
FIG. 3 is a diagram illustrating a flow of printing from a mobile terminal.

A flow of printing from the mobile terminal 10 will next be described. FIG. 3 is a diagram illustrating a flow of printing from a mobile terminal. The mobile terminal illustrated by reference to FIG. 3 may be the mobile terminal 10 illustrated in FIG. 1. Incidentally, the user stores a printing file in the cloud storage 21a in advance by using the storage client 11.

As illustrated in FIG. 3, the user posts the URL of the printing file with a printing channel as a posting destination (t1). Here, the printing channel is a channel used for a chat with the printing chat bot 26.

Figure 4:
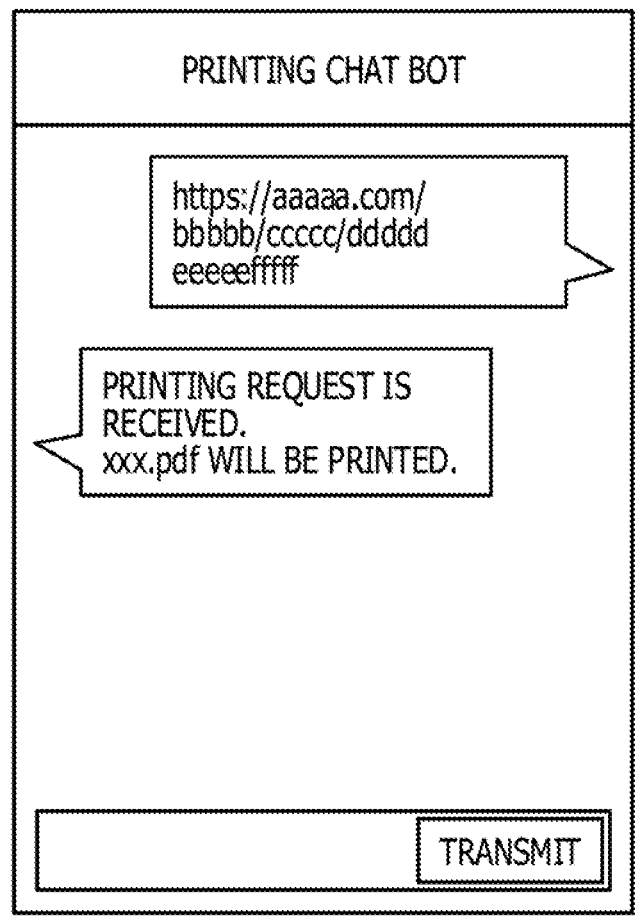
FIG. 4 is a diagram illustrating an example of a URL posting screen.

FIG. 4 is a diagram illustrating an example of a URL posting screen. In FIG. 4, "https://aaaaa.com/bbbbb/ccccc/dddddeeeefffff" is posted as the URL, and a response to the effect that a printing request is accepted is made from the printing chat bot 26.

When posting to the printing channel is performed, the chat cloud 22 transmits the posted URL to the printing chat bot 26 (t2). The printing chat bot 26 receives the URL, and obtains the printing file from the cloud storage 21a by specifying the received URL (t3 and t4). Then, the printing chat bot 26 generates a printing request, and transmits the generated printing request to the printing server 31 (t5).

When the printing server 31 receives the printing request, the printing server 31 stores a printing job. Then, when the MFP 40 requests a printing job list based on an instruction of the user, the printing server 31 transmits the printing job list to the MFP 40. The MFP 40 displays a printing job list screen on a panel (t6), and transmits data of the printing file selected by the user to the MFP 40 (t7). The MFP 40 then performs printing.

Incidentally, instead of copying and posting the URL, the user may also display and post the URL on the posting screen by selecting the printing file from a file list or opening the printing file and giving an instruction to share the printing file with the printing chat bot 26.

Figure 5:
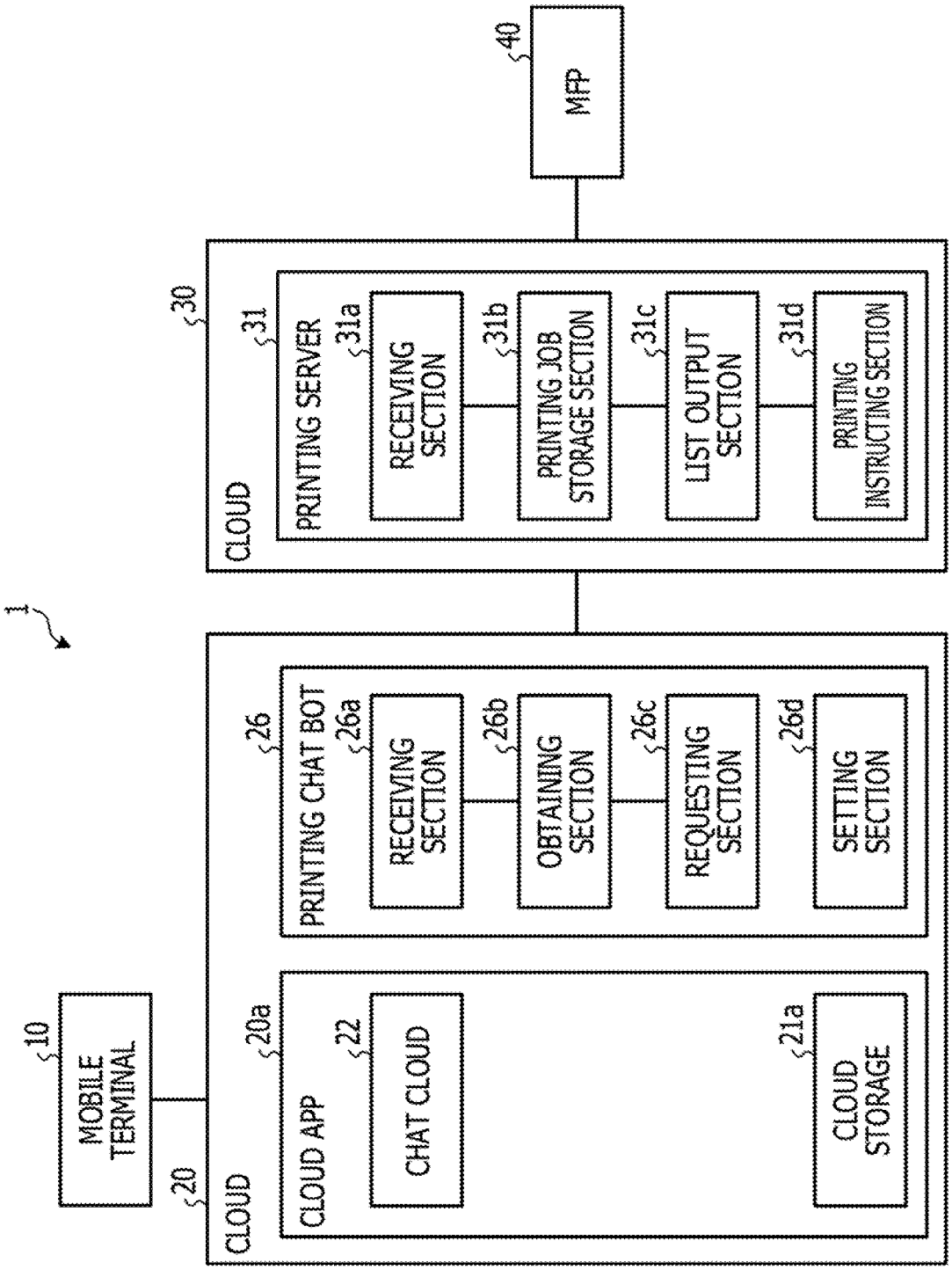
FIG. 5 is a diagram illustrating functional configurations of a printing chat bot and a printing server.

Description will next be made of functional configurations of the printing chat bot 26 and the printing server 31. FIG. 5 is a diagram illustrating functional configurations of the printing chat bot 26 and the printing server 31. As illustrated in FIG. 5, the printing chat bot 26 includes a receiving section 26a, an obtaining section 26b, a requesting section 26c, and a setting section 26d. These functional sections are implemented by executing a program by a computer included in the cloud 20.

The receiving section 26a receives the URL of the printing file from the chat cloud 22, and passes the received URL to the obtaining section 26b. In addition, the receiving section 26a obtains a login ID of the user from the chat cloud 22 together with the URL. Here, the login ID is an identifier identifying the user. The user inputs the login ID from the mobile terminal 10 in a case of using service provided by the client app 10a and the cloud app 20a in cooperation with each other. The login ID is, for example, an email address.

The obtaining section 26b obtains the printing file from the cloud storage 21a by using the URL and the login ID received from the receiving section 26a. In addition, the obtaining section 26b obtains a print ID of the user from the cloud storage 21a by using the login ID received from the receiving section 26a. Here, the print ID is an identifier used for user authentication when the user makes the printing file printed by the MFP 40. The print ID is, for example, the identification number of an integrated circuit (IC) card carried as an identification card by each employee.

Incidentally, the obtaining section 26b may obtain an access right to the printing file from the storage cloud 21, and obtain the printing file based on the access right. FIG. 6 is a diagram illustrating an example of access determination. As illustrated in FIG. 6, supposing that a poster of the URL is "userA," in a case where an owner of the printing file is "userA," the poster of the URL has the access right to the printing file. In addition, in a case where the owner of the printing file is "userB," the poster of the URL has the access right to the printing file when the poster of the URL can edit the printing file, can view the printing file, or knows the URL.

In addition, the obtaining section 26b may obtain the printing file and the print ID from the cloud storage 21a by using only the URL received from the receiving section 26a.

The requesting section 26c generates a printing request using the printing file and the print ID obtained by the obtaining section 26b, and transmits the printing request to the printing server 31. In a case where the printing file is not a portable document format (PDF) file, for example, the requesting section 26c converts the printing file into a PDF format, and generates the printing request using the printing file in the PDF format.

The setting section 26d obtains the login ID and the print ID from the chat cloud 22, and instructs the storage cloud 21 to associate the two IDs with each other by registering the print ID in a setting file corresponding to the login ID in the cloud storage 21a. Incidentally, the chat cloud 22 obtains the print ID input from the mobile terminal 10 by the user via the chat client 12.

The printing server 31 includes a receiving section 31a, a printing job storage section 31b, a list output section 31c, and a printing instructing section 31d. These functional sections are implemented by executing a program by the printing server 31.

The receiving section 31a receives the printing request from the printing chat bot 26, and stores the printing request as a printing job in the printing job storage section 31b. The printing job storage section 31b stores the print ID and the printing file in association with each other.

The list output section 31c receives the print ID from the MFP 40, retrieves the printing job of the print ID from the printing job storage section 31b, and displays information regarding the retrieved printing job as a job list on the MFP 40.

The printing instructing section 31d generates data for printing from the printing file of the printing job selected by the user from the job list, and instructs the MFP 40 to perform printing.

Figure 7:
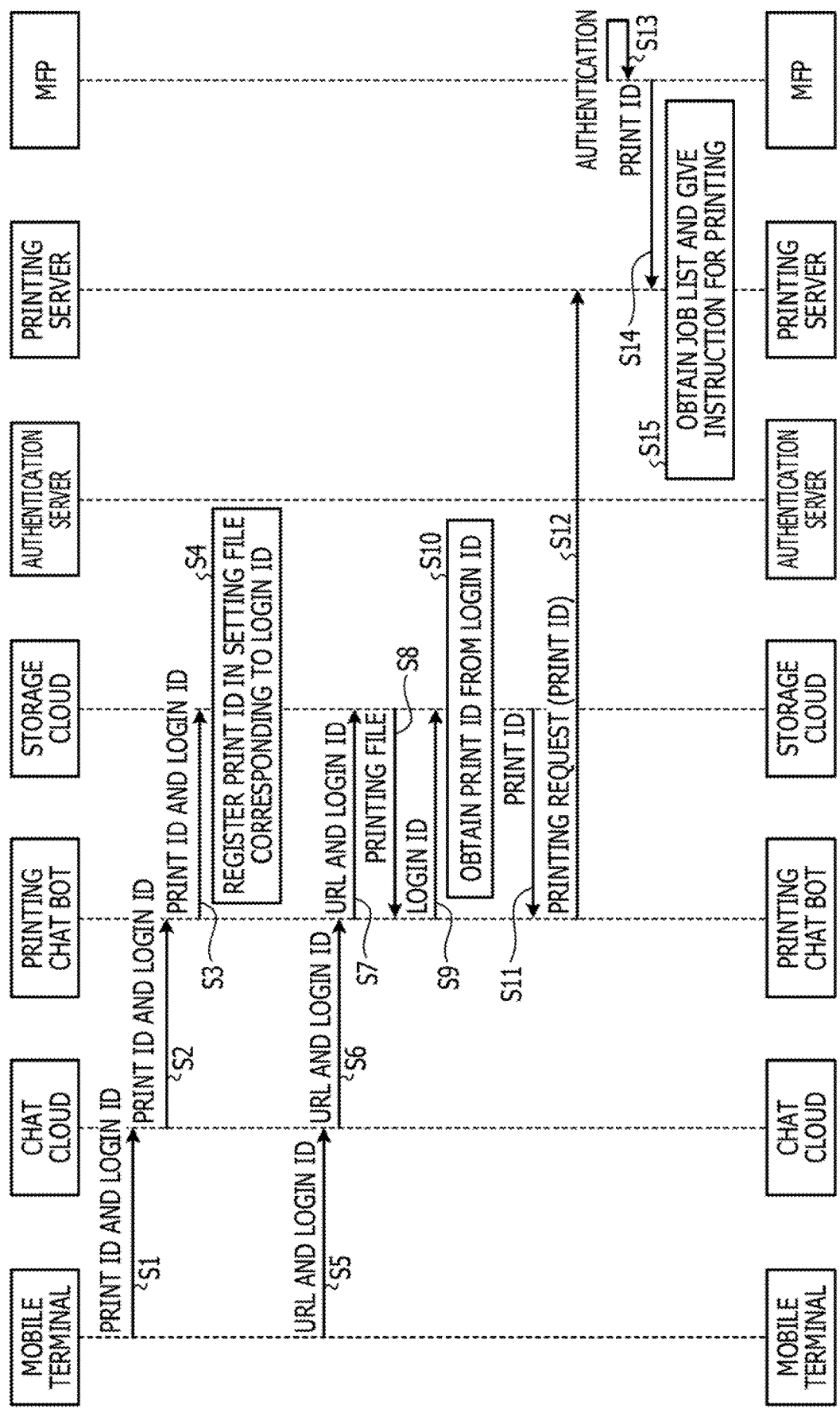
FIG. 7 is a diagram illustrating a sequence of processing related to printing from a mobile terminal.

Description will next be made of a sequence of processing related to printing from the mobile terminal 10. FIG. 7 is a diagram illustrating a sequence of processing related to printing from a mobile terminal. The mobile terminal illustrated by reference to FIG. 7 may be the mobile terminal 10 illustrated in FIG. 1. Steps S1 to S4 in FIG. 7 are processing of associating the print ID and the login ID with each other. Steps S5 to S15 in FIG. 7 are printing processing.

As illustrated in FIG. 7, in the processing of associating the print ID and the login ID with each other, the mobile terminal 10 transmits the print ID and the login ID to the chat cloud 22 based on a print ID registration instruction of the user (step S1). The chat cloud 22 then transmits the print ID and the login ID to the printing chat bot 26 (step S2). Then, the printing chat bot 26 transmits the print ID and the login ID to the storage cloud 21 and instructs the storage cloud 21 to perform association (step S3). The storage cloud 21 then associates the print ID and the login ID with each other by registering the print ID in the setting file corresponding to the login ID (step S4).

In addition, in the printing processing, the mobile terminal 10 transmits the URL of the printing file and the login ID of the user to the chat cloud 22 (step S5). The chat cloud 22 then transmits the URL and the login ID to the printing chat bot 26 (step S6).

Then, the printing chat bot 26 transmits the URL and the login ID to the storage cloud 21 (step S7), and requests the printing file. The storage cloud 21 then transmits the printing file to the printing chat bot 26 (step S8). In addition, the printing chat bot 26 transmits the login ID to the storage cloud 21 (step S9), and requests the print ID. Then, the storage cloud 21 obtains the print ID from the login ID (step S10), and transmits the print ID to the printing chat bot 26 (step S11). Then, the printing chat bot 26 generates a printing request using the printing file and the print ID, and transmits the printing request to the printing server 31 (step S12).

Then, the MFP 40 performs user authentication (step S13). When the authentication succeeds, the MFP 40 transmits the print ID to the printing server 31 (step S14). Then, the printing server 31 obtains a job list of the print ID and transmits the job list to the MFP 40, and instructs the MFP 40 to print the printing file selected by the user from the job list (step S15).

Thus, the printing chat bot 26 may generate the printing request by obtaining the print ID corresponding to the login ID from the storage cloud 21.

As described above, in the embodiment, the chat cloud 22 transmits the URL posted by the user and the login ID of the user to the printing chat bot 26. The printing chat bot 26 obtains the printing file from the storage cloud 21 by using the URL and the login ID, and obtains the print ID from the storage cloud 21 by using the login ID. Then, the printing chat bot 26 generates a printing request using the print ID and the printing file, and transmits the printing request to the printing server 31. Then, the printing server 31 stores the print ID and the printing file in association with each other as a printing job, and transmits a list of the printing job including the print ID to the MFP 40 when receiving the print ID from the MFP 40. Hence, the printing system 1 may obviate the need to install a dedicated app on the mobile terminal 10.

Figure 8:
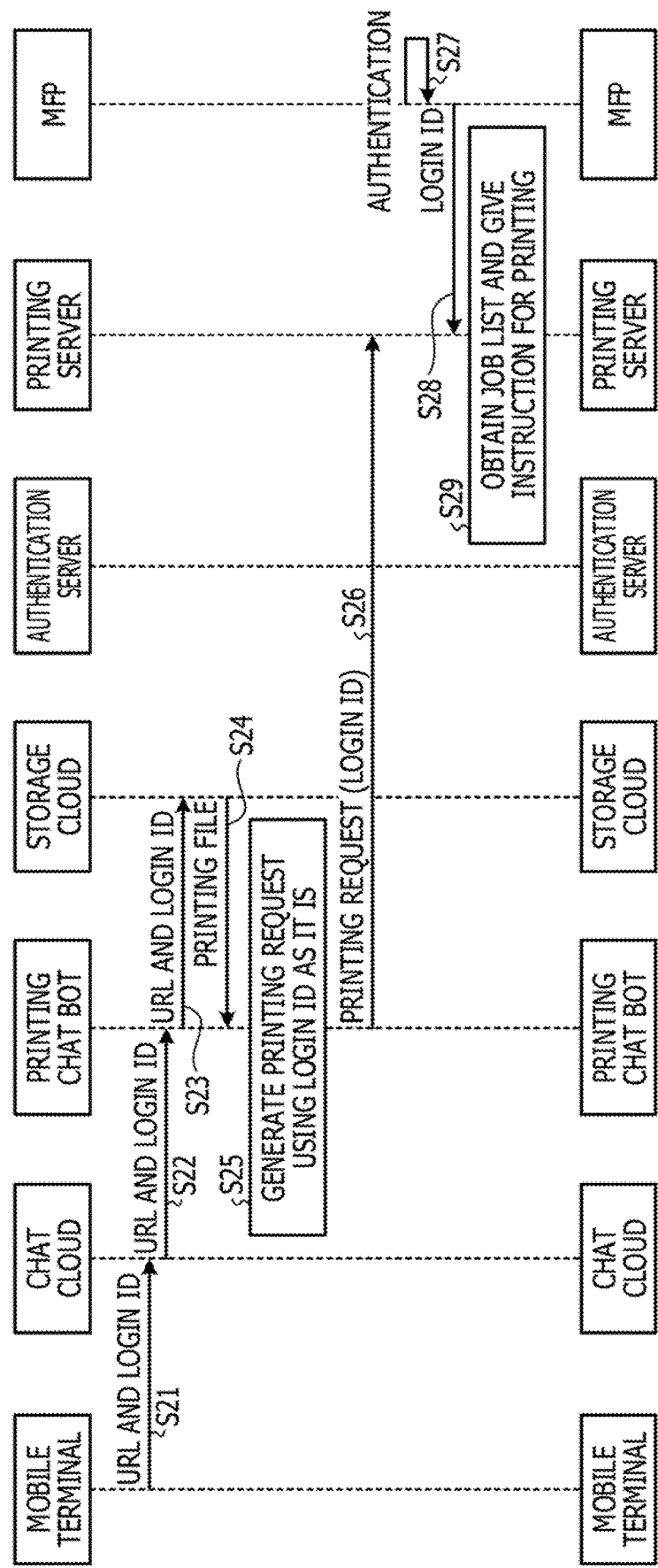
FIG. 8 is a diagram illustrating a sequence of processing related to printing from a mobile terminal in a case where a print identifier (ID) is used as a login ID.

In addition, while the case of using the login ID and the print ID has been described in the embodiment, the print ID may be used as the login ID. FIG. 8 is a diagram illustrating a sequence of processing related to printing from a mobile terminal in a case where a print ID is used as a login ID. The mobile terminal illustrated by reference to FIG. 8 may be the mobile terminal 10 illustrated in FIG. 1. In FIG. 8, because the print ID is used as the login ID, there is no sequence of processing of associating the print ID and the login ID with each other, but there is only a sequence of printing processing.

As illustrated in FIG. 8, the mobile terminal 10 transmits the URL of the printing file and the login ID of the user to the chat cloud 22 (step S21). The chat cloud 22 then transmits the URL and the login ID to the printing chat bot 26 (step S22).

Then, the printing chat bot 26 transmits the URL and the login ID to the storage cloud 21 (step S23), and requests the printing file. The storage cloud 21 then transmits the printing file to the printing chat bot 26 (step S24). Then, the printing chat bot 26 generates a printing request using the login ID as it is (step S25), and transmits the printing request to the printing server 31 (step S26).

Then, the MFP 40 performs user authentication (step S27). When the authentication succeeds, the MFP 40 transmits the login ID to the printing server 31 (step S28). Then, the printing server 31 obtains a job list of the login ID and transmits the job list to the MFP 40, and instructs the MFP 40 to print the printing file selected by the user from the job list (step S29).

By thus using the print ID as the login ID, the printing system 1 may obviate the need for the operation of associating the print ID and the login ID with each other, and simplify operation related to printing from the mobile terminal 10.

Figure 9:
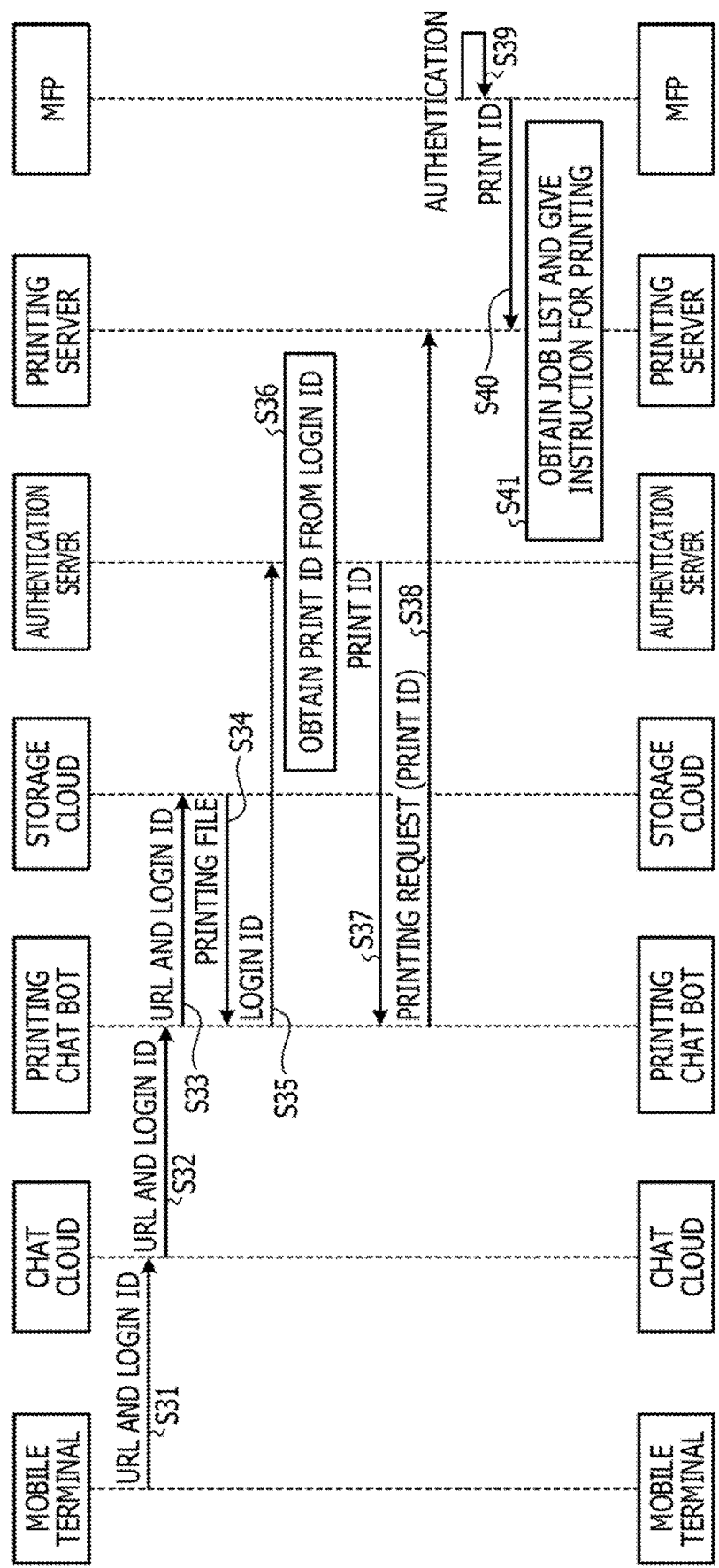
FIG. 9 is a diagram illustrating a sequence of processing related to printing from a mobile terminal in a case where a print ID is obtained from an authentication server.

In addition, the association of the print ID and the login ID with each other may be managed by an authentication server. FIG. 9 is a diagram illustrating a sequence of processing related to printing from a mobile terminal in a case where a print ID is obtained from an authentication server. The mobile terminal illustrated by reference to FIG. 9 may be the mobile terminal 10 illustrated in FIG. 1. In FIG. 9, because the association of the print ID and the login ID with each other is managed by the authentication server, there is no sequence of processing of associating the print ID and the login ID with each other, but there is only a sequence of printing processing.

As illustrated in FIG. 9, the mobile terminal 10 transmits the URL of the printing file and the login ID of the user to the chat cloud 22 (step S31). The chat cloud 22 then transmits the URL and the login ID to the printing chat bot 26 (step S32).

Then, the printing chat bot 26 transmits the URL and the login ID to the storage cloud 21 (step S33), and requests the printing file. The storage cloud 21 then transmits the printing file to the printing chat bot 26 (step S34). In addition, the printing chat bot 26 transmits the login ID to the authentication server (step S35), and requests the print ID. Then, the authentication server obtains the print ID from the login ID (step S36), and transmits the print ID to the printing chat bot 26 (step S37). Then, the printing chat bot 26 generates a printing request using the printing file and the print ID, and transmits the printing request to the printing server 31 (step S38).

Then, the MFP 40 performs user authentication (step S39). When the authentication succeeds, the MFP 40 transmits the print ID to the printing server 31 (step S40). Then, the printing server 31 obtains a job list of the print ID and transmits the job list to the MFP 40, and instructs the MFP 40 to print the printing file selected by the user from the job list (step S41).

By thus using the authentication server, the printing system 1 may obviate the need for the operation of associating the print ID and the login ID with each other, and simplify operation related to printing from the mobile terminal 10.

Figure 10:
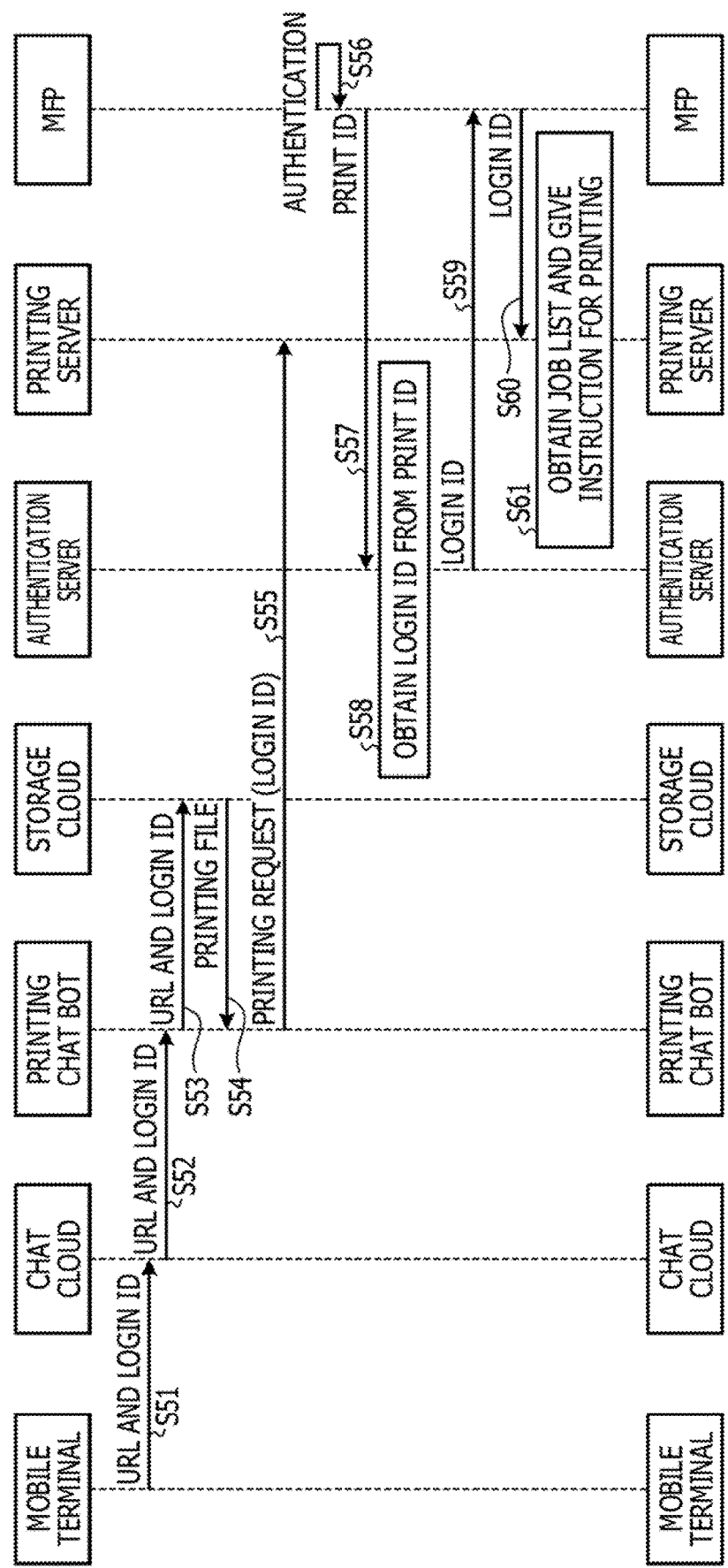
FIG. 10 is a diagram illustrating a sequence of processing related to printing from a mobile terminal in a case where an MFP obtains a print ID from an authentication server.

In addition, the authentication server may also be used by the MFP 40 in place of the printing chat bot 26. FIG. 10 is a diagram illustrating a sequence of processing related to printing from a mobile terminal in a case where an MFP uses an authentication server. The mobile terminal and the MFP illustrated by reference to FIG. 10 may be the mobile terminal 10 and the MFP 40 illustrated in FIG. 1, respectively.

As illustrated in FIG. 10, the mobile terminal 10 transmits the URL of the printing file and the login ID of the user to the chat cloud 22 (step S51). The chat cloud 22 then transmits the URL and the login ID to the printing chat bot 26 (step S52).

Then, the printing chat bot 26 transmits the URL and the login ID to the storage cloud 21 (step S53), and requests the printing file. The storage cloud 21 then transmits the printing file to the printing chat bot 26 (step S54). Then, the printing chat bot 26 generates a printing request using the printing file and the login ID, and transmits the printing request to the printing server 31 (step S55).

Then, the MFP 40 receives a request for user authentication based on the print ID (step S56), and transmits the print ID to the authentication server (step S57). When the authentication then succeeds in the authentication server, the authentication server obtains the login ID from the print ID (step S58), and transmits the login ID to the MFP 40 (step S59).

Then, the MFP 40 transmits the login ID to the printing server 31 (step S60). Then, the printing server 31 obtains a job list of the login ID and transmits the job list to the MFP 40, and instructs the MFP 40 to print the printing file selected by the user from the job list (step S61).

When the MFP 40 thus uses the authentication server, the printing system 1 may obviate the need for the operation of associating the print ID and the login ID with each other, and simplify operation related to printing from the mobile terminal 10.

Figure 11:
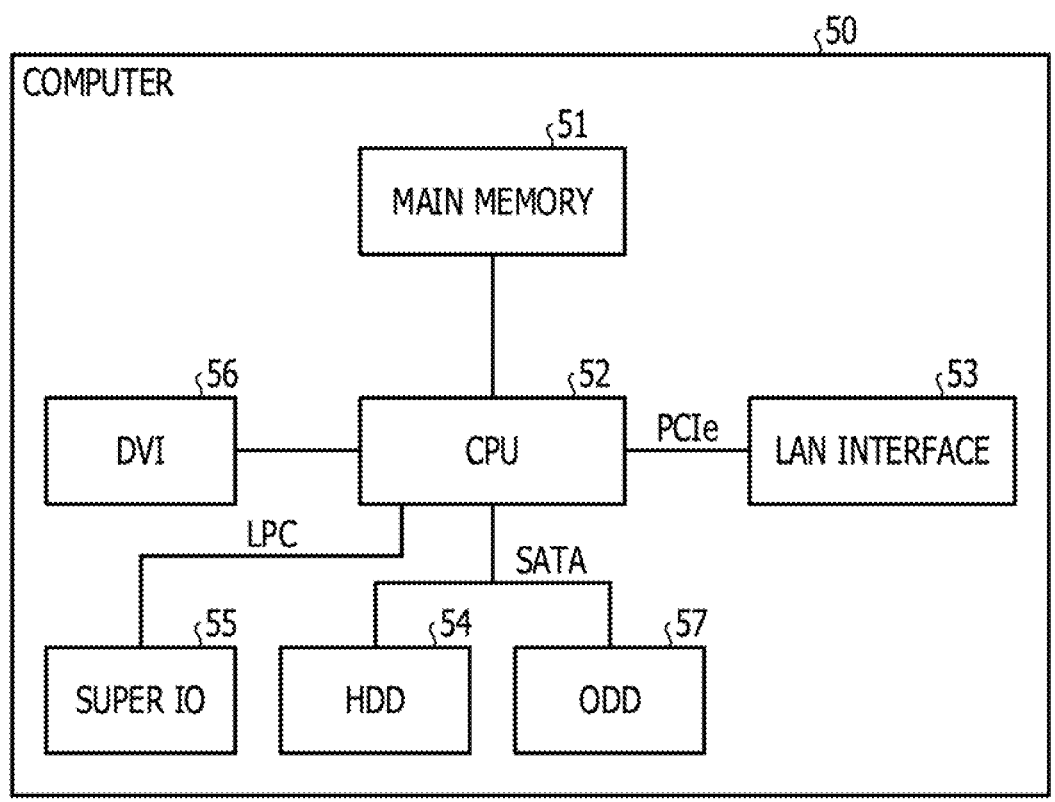
FIG. 11 is a diagram illustrating an example of hardware configuration of computers included in clouds.

Description will next be made of an example of hardware configuration of computers included in the cloud 20 and the cloud 30. FIG. 11 is a diagram illustrating an example of hardware configuration of computers included in clouds. The clouds illustrated by reference to FIG. 11 may be the cloud 20 and the cloud 30 illustrated in FIG. 1.

The storage cloud 21 operates as a storage managing device by being executed by a computer whose hardware configuration example is illustrated in FIG. 11. The chat cloud 22 operates as a chat device by being executed by a computer whose hardware configuration example is illustrated in FIG. 11. The printing chat bot 26 operates as a printing chat bot device by being executed by a computer whose hardware configuration example is illustrated in FIG. 11.

In addition, the printing server 31 is a computer whose hardware configuration example is illustrated in FIG. 11, and operates as a printing control device by executing a program having functions illustrated in FIG. 5. The authentication server operates as an authentication device when a computer whose hardware configuration example is illustrated in FIG. 11 executes a program that performs processing of associating the print ID and the login ID with each other and obtains the login ID from the print ID and the print ID from the login ID.

In addition, a program having a plurality of instructions, the program being obtained by combining a program implementing the functions of the printing chat bot 26 illustrated in FIG. 5 and a program implementing the functions of the printing server 31 with each other, will be referred to as a printing control program in the following. In addition, a device obtained by combining the printing chat bot device and the printing control device with each other will be referred to as a printing processing device in the following. The printing processing device is an example of a printing control system.

As illustrated in FIG. 11, a computer 50 includes a main memory 51, a central processing unit (CPU) 52, a local area network (LAN) interface 53, and a hard disk drive (HDD) 54. The computer 50 also includes a super input output (IO) 55, a digital visual interface (DVI) 56, and an optical disk drive (ODD) 57.

The main memory 51 is a memory that stores a program, an execution in-progress result of the program, and the like. The CPU 52 is a central processing unit that reads the program from the main memory 51, and executes the program. The CPU 52 includes a chip set including a memory controller.

The LAN interface 53 is an interface for coupling the computer 50 to another computer via a LAN. The HDD 54 is a disk device that stores a program and data. The super IO 55 is an interface for coupling an input device such as a mouse, a keyboard, and the like. The DVI 56 is an interface for coupling a liquid crystal display device. The ODD 57 is a device that reads and writes a digital versatile disc (DVD).

The LAN interface 53 is coupled to the CPU 52 by peripheral component interconnect express (PCIe). The HDD 54 and the ODD 57 are coupled to the CPU 52 by Serial Advanced Technology Attachment (SATA). The super IO 55 is coupled to the CPU 52 by Low Pin Count (LPC).

Then, the printing control program executed in two computers 50 in a distributed manner is stored on a DVD as an example of a recording medium readable by the computers 50, and is read from the DVD by the ODD 57 and installed on the two computers 50. Alternatively, the printing control program is stored in databases of another computer system coupled via the LAN interface 53 or the like, and is read from these databases and installed on the two computers 50. Then, the installed printing control program is stored on the HDD 54, and is read into the main memory 51 and executed by the CPU 52.

In addition, while description has been made of the case of using the mobile terminal 10 in the embodiment, the printing system 1 may use, for example, a terminal such as a desktop personal computer or the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computer-implemented printing control method comprising:
    receiving a first identifier input at a time of logging in to an application on a terminal, and information indicating a storage location of printing data stored in a storage device, an instruction to print the printing data being received on the application;
    transmitting, in accordance with at least one of the first identifier or the information, a request for acquiring the printing data to a storage application configured to control the storage device;
    storing the printing data acquired from the storage application in association with a second identifier;
    outputting a list of the printing data stored in association with the second identifier in response to receiving the second identifier from a printing device; and
    transmitting another request for acquiring the second identifier corresponding to the first identifier to an authentication server,
    wherein the storing of the printing data includes storing the printing data acquired from the storage application in association with the second identifier acquired from the authentication server.

2. The printing control method according to claim 1, wherein
    the first identifier and the second identifier are an identical individual identifier.

3. The printing control method according to claim 1, wherein
    the request includes a request for acquiring the second identifier corresponding to the first identifier.

4. A printing control system comprising:
    a printing device;
    a printing control device configured to control the printing device;
    a terminal device configured to interact with a user;
    a storage control device configured to store and manage data of the user in a nonvolatile storage device;
    a chat device configured to perform processing related to a chat of the user; and
    a bot device configured to operate as a chat partner of the user,
    wherein
        the terminal device is configured to transmit information regarding a storage location of data designated by the user and a first identifier identifying the user to the chat device,
        the chat device is configured to transmit, to the bot device, the information received from the terminal device,
        the bot device is configured to:
            transmit a request for acquiring the data to the storage control device in accordance with the information received from the chat device, and
            transmit, to the printing control device, a printing request based on the data and a second identifier received from the storage control device in response to the request, and
        the printing control device is configured to:
            store the printing request transmitted from the bot device as a printing job, and
            transmit a list of the printing job including the second identifier to the printing device in response to receiving the second identifier from the printing device.

* * * * *